United States Patent [19]

Emberson

[11] Patent Number: 5,838,945
[45] Date of Patent: Nov. 17, 1998

[54] TUNABLE SOFTWARE CONTROL OF HARVARD ARCHITECTURE CACHE MEMORIES USING PREFETCH INSTRUCTIONS

[75] Inventor: David R. Emberson, Santa Cruz, Calif.

[73] Assignee: Sun Microsystems, Inc., Mountain View, Calif.

[21] Appl. No.: 953,220

[22] Filed: Oct. 17, 1997

Related U.S. Application Data

[63] Continuation of Ser. No. 499,312, Jul. 7, 1995, abandoned.

[51] Int. Cl.[6] ....................................... G06F 9/22
[52] U.S. Cl. ............................................. 395/376
[58] Field of Search ................... 395/376, 381; 711/118

[56] References Cited

U.S. PATENT DOCUMENTS

| | | | |
|---|---|---|---|
| 4,454,578 | 6/1984 | Matsumoto et al. | 395/380 |
| 4,502,110 | 2/1985 | Saito | 395/450 |
| 4,551,799 | 11/1985 | Ryan et al. | 395/467 |
| 5,095,424 | 3/1992 | Woffinden et al. | 395/425 |
| 5,168,560 | 12/1992 | Robinson et al. | 395/425 |
| 5,261,066 | 11/1993 | Jouppi et al. | 395/425 |
| 5,305,389 | 4/1994 | Palmer | 382/1 |
| 5,307,477 | 4/1994 | Taylor et al. | 395/425 |
| 5,317,718 | 5/1994 | Jouppi | 395/425 |
| 5,367,656 | 11/1994 | Ryan | 395/425 |
| 5,410,653 | 4/1995 | Macon, Jr. et al. | 395/250 |
| 5,537,573 | 7/1996 | Ware et al. | 395/464 |
| 5,551,001 | 8/1996 | Cohen et al. | 395/449 |
| 5,603,004 | 2/1997 | Kurpanek et al. | 395/445 |
| 5,623,608 | 4/1997 | Ng | 395/250 |

OTHER PUBLICATIONS

Kai Hwang and Faye A. Briggs "Computer Architecture and Parallel Processing", 1984, McGraw–Hill, Inc., pp. 102–107.

*Primary Examiner*—David Y. Eng
*Attorney, Agent, or Firm*—Marger, Johnson, McCollom & Stolowitz, P.C.

[57] ABSTRACT

Disclosed is an instruction-level method and system for prefetching data or instructions of variable size to specified cache sets. A prefetch instruction containing binary fields allows the compiler, loader or runtime software to control cache prefetching and reduce thrashing by providing the prefetch hardware with information as to the optimal cache set location and the optimal amount of data to be prefetched. Support of Harvard architectures with separate instruction and data caches is provided by separate software control of instruction and data caches. The cache set number is identified to indicate into which set the information is to be preloaded. The size field provides a variable prefetch size. An address field indicates the address where prefetching begins.

16 Claims, 4 Drawing Sheets

TUNABLE SOFTWARE CONTROL OF HARVARD ARCHITECTURE CACHE MEMORIES USING PREFETCH INSTRUCTIONS

This is a Continuation of application Ser. No. 08/499,312 filed Jul. 7, 1995, now abandoned.

FIELD OF THE INVENTION

This invention relates to cache memory, and more particularly relates to prefetch instructions which provide data and instructions to the cache memory from the main memory.

BACKGROUND OF THE INVENTION

The computer industry constantly strives to develop new computer components which operate at greater speeds than the last generation of components. As the newest generation of microprocessors operate at yet greater processing speeds than those before it, the demand for high speed data and instruction retrieval increases as well.

In computer architecture, a microprocessor (the CPU) is a separate component from the main memory, the two connected by a bus. As the CPU operates, it must access both data and instructions from the main memory to carry out its operations. The access time for data and instruction retrieval from the main memory typically severely slows the operation of the CPU because the CPU spends a lot of time simply waiting to receive the requested data or instructions. This time lag is called memory latency.

There are two components to memory latency. The first, bus transport time, is a function of how much time it takes to transport the request to the memory and then to transport the requested information. The second is the main memory access time itself. Address decoding and other logic of the dynamic RAMs' (DRAM) CMOS technology are responsible for the inherent delay in accessing information from the main memory.

At the current time, a CPU may have a less than 10 nanosecond clock while a main memory may have a 60 nanosecond clock, the combination creating a 6 to 1 memory latency ratio. In the near future, an improved microprocessors are expected to have less than 3 nanosecond clocks, while main memory is expected to improve to having only a 50 nanosecond clock. Thus the memory latency is expected to increase to a greater than 15:1 ratio.

In the early 1960s, memory local to the CPU was developed to reduce the effect of memory latency. Today, data and instructions which are frequently used are stored in the "cache" memory which is closer to the CPU in addition to being stored in main memory. A cache has capacity for far fewer lines than does the main memory and is static RAM (SRAM) (which is much faster, consumes much more power and is much more expensive than DRAM).

Accordingly, the function of a cache is to reduce the effect of memory latency by placing often used data or instructions close to the CPU instead calling it from the main memory from where it takes much longer access.

Turning to FIG. 1, the simplest type of cache, a single-set cache, is shown. The main memory 10 is depicted as being substantially farther away from the cache 12 and CPU 14 combination than are the cache 12 and CPU 14 from each other. While cache 12 reduces the effects of memory latency, its structure introduces problems of its own. Particularly, the problem of "thrashing" introduces a speed payment known as "miss penalty."

Thrashing results from the limitation of the minimal cache offset (line) structure where in a common single-set cache, there is space allocated for the equivalent of a single page (having multiple lines numbered in 100 offset unit increments from 100–1000, for example). Returning to FIG. 1, main memory 10 is broken down in five "virtual pages" (in practice, a main memory would include many more virtual pages) each including lines from 100–1000 in 100 offset unit increments. Thus, the first virtual page occupies lines 100–1000, the second includes lines 1100–2000 and so on.

To illustrate thrashing, FIG. 1 shows that the CPU has requested line 1400 which is retrieved from main memory and is stored in offset 400 of the cache. Sometime shortly thereafter, the CPU has requested line 2400 which is retrieved from main memory and is also mapped into offset 400 of the cache and thus has overwritten the previously stored line 1400. Here, a miss penalty has been incurred because the cache did not contain the requested line and was required to retrieve it from main memory. Shortly thereafter, the CPU again requires and requests line 1400 which is retrieved from main memory and mapped into offset 400 of the cache and therefore has overwritten previously stored line 2400. Again, a miss penalty has been incurred. When the two lines, 1400 and 2400 are both needed on a regular basis by the CPU, the ping-pong effect of thrashing causes the miss penalty to be repeatedly incurred.

Thrashing severely slows down the CPU's processing speed because so much time is spent waiting for frequently used information (data or instructions) to be received from the main memory. In such a case, compounded miss penalties dominate the CPU's performance. Conversely, had the often used information been stored in the cache at all times, the CPU could have operated at its peak capacity. Accordingly, as microprocessor speeds continue to improve, the payment for miss penalties increases as well.

There are many different types of cache structures which have been introduced in an effort to eliminate the thrashing problem. For example, one popular solution is to use, instead of a single-set cache, a "multi-set cache." Turning to FIG. 2, a two-set cache, which can potentially provide more than one offset location for otherwise competing lines, is shown. Both set 12 and set 13 have a 400 offset location in which to store information. Thus, both lines 1400 and 2400 can be stored in the cache simultaneously and alternating requests for either of these most likely will not cause thrashing. The actual benefit of multi-set cache is dependent upon the program running. However, even with the multi-set improvement over the single-set cache, the performance cost for miss penalties continues to increase as CPU processing speed increases.

In Harvard architecture where there are separate caches for data and instructions, thrashing is reduced, at least to the extent that data thrashes with instructions. Of course, as mentioned above, SRAM is expensive and so the number of sets of a multi-set cache, particularly in a Harvard architecture, has its limitations.

Another method for avoiding thrashing is to "prefetch" data and instructions to the cache before they are needed. That is, various mechanisms exist which attempt to predict what the CPU is going to need before it is actually needed rather than waiting for the request from the CPU. For example, built into the SPARC (R) version 9 architecture is the capability to execute data prefetch instructions that will prefetch data to the data cache. However, the prefetch instruction provides a prefetch of an invariable, static size and provides no other capabilities.

While the Harvard architecture provides different caches in which to store instructions and data and the prior art prefetch provides for the prefetching of data, currently there exists no mechanism to cause both instructions and data to be written to their appropriate caches. Moreover, there is no mechanism to control the size of the prefetch or the particular set of a multi-set cache to which the information is written. In light of the significant improvements to the speed of CPU's expected in the near future, it would be advantageous to provide prefetch controls which further reduce the likelihood of thrashing.

SUMMARY OF THE INVENTION

This invention is an instruction-level method and system for prefetching data or instructions of variable size to specified cache sets. A prefetch instruction containing binary fields allows the compiler, loader or runtime software to control cache prefetching by providing the prefetch hardware with information as to the optimal cache set location and the optimal amount of data to be prefetched and thus reduce thrashing. Support of Harvard architectures with separate instruction and data caches is provided by separate software control of instruction and data caches. That is, the prefetch instruction indicates whether the prefetch is for data or instructions. The cache set number is identified to indicate into which set the information is to be preloaded. The size field provides a variable prefetch size. An address field indicates the address where prefetching begins.

DETAILED DESCRIPTION OF THE INVENTION

As discussed above, various mechanisms exist which attempt to predict what information the CPU is going to need before it is actually needed rather than waiting for the request from the CPU. Certain prefetch mechanisms perform prefetches in anticipation of the next line to be missed by the cache. In general, the line following the last line fetched is prefetched and stored in the line buffer, with the assumption made that all misses are compulsory; that is, the fetched line has not previously resided in the cache. Caches where there is a prefetch in anticipation of the next miss are called "fetch always" or Class 2 caches. Conversely, caches where only missed lines are fetched are called Class 1, fetch on demand, or fetch on fault caches. This invention is used in combination with any type of the prefetch mechanism and is executed as an extension to an initial prefetch command to manage the cache structure.

In a computer system, the compiler incorporates into the object program any instructions required to run the program on a given computer. That is, a compiler is a program that converts an input program in a particular high-level language (source code) to the machine language of a particular machine type (object code). Accordingly, the above described prefetch commands are generated by a compiler and are executed as part of the resulting object code.

Figure 1:
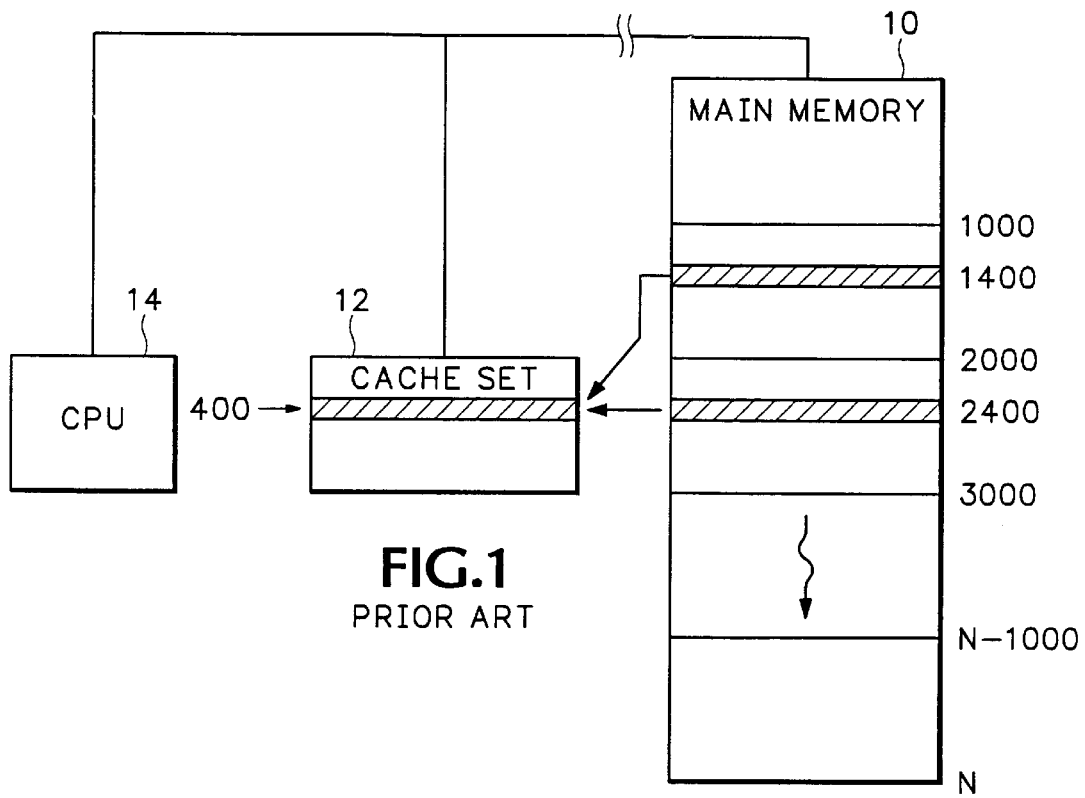
FIG. 1 depicts a prior art single-set cache.
Figure 2:
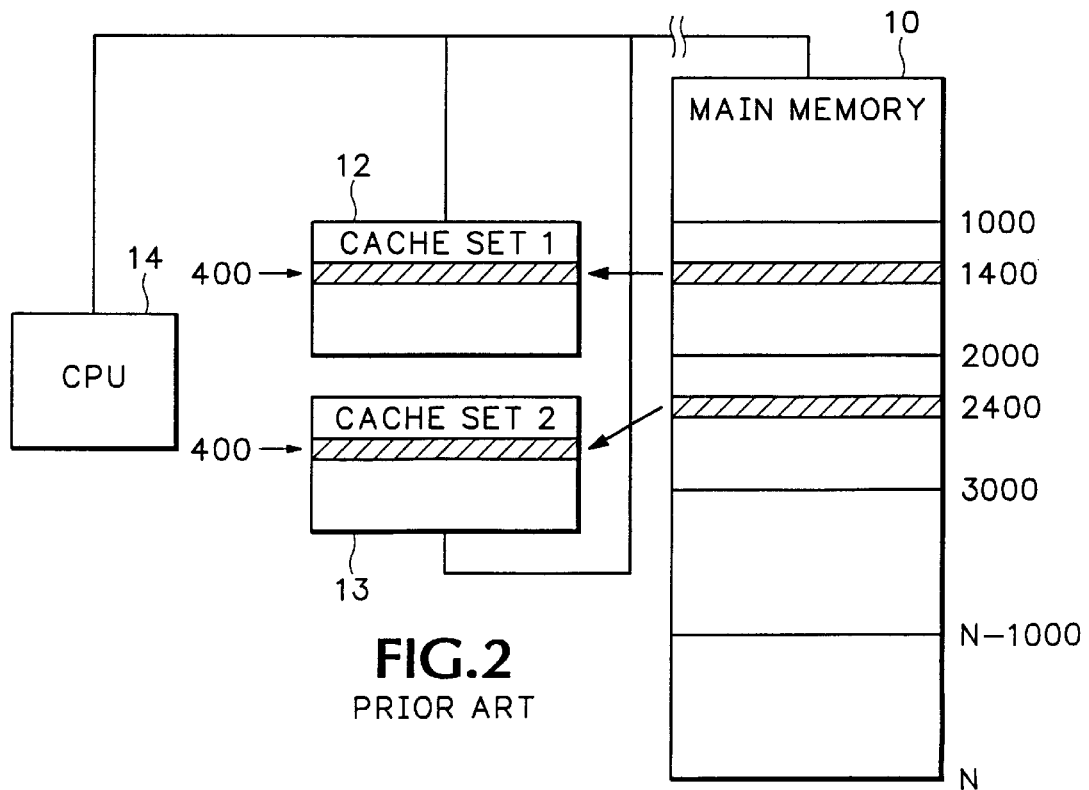
FIG. 2 depicts a prior art multi-set cache.
Figure 3:
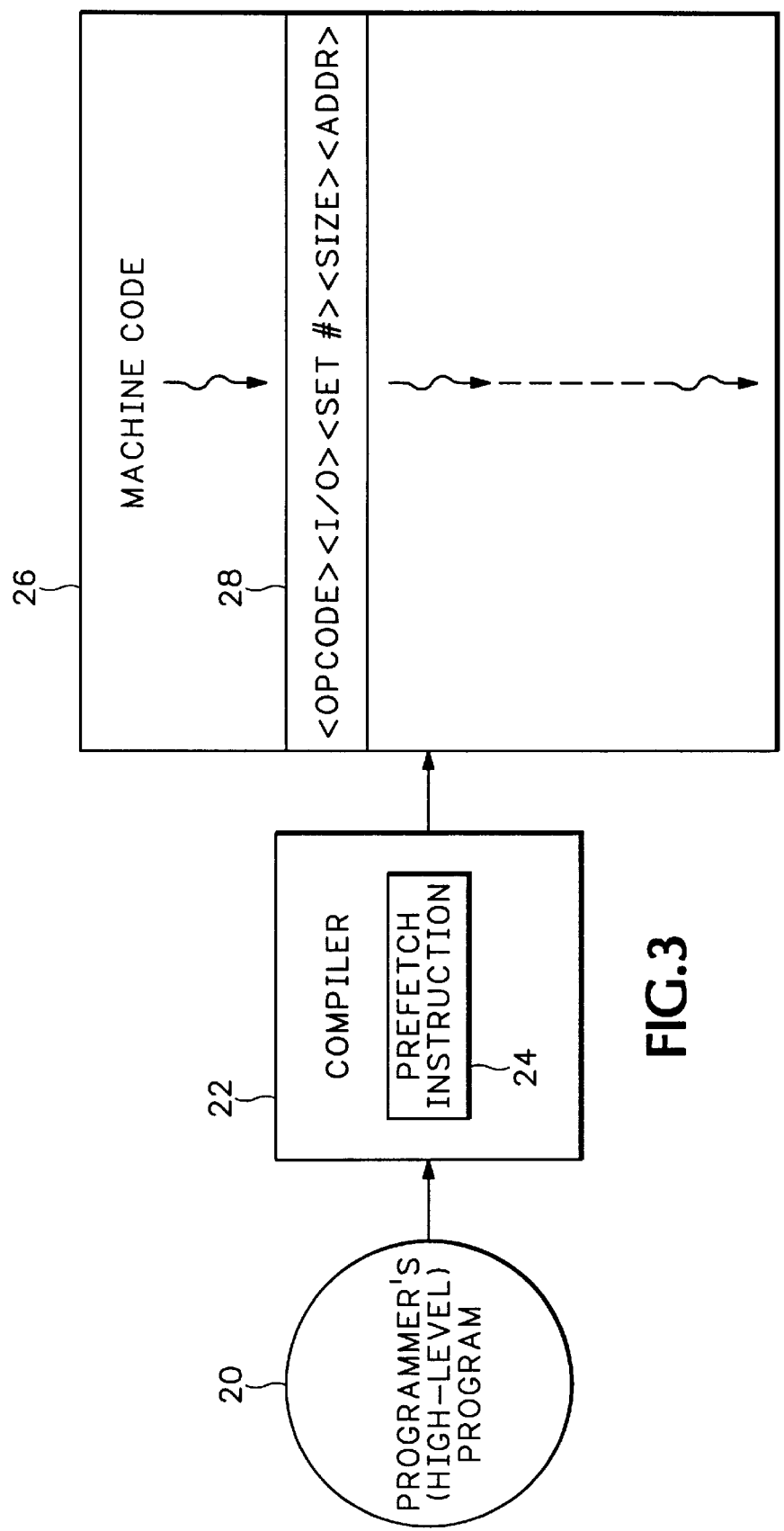
FIG. 3 shows the relationship between the high-level program, the compiler which inserts the subject instruction and the machine code including the subject instruction.

Turning to FIG. 3, a programmer's program 20 (source code) is translated by compiler 22 which inserts a prefetch instruction 24 into the object code (machine code) 26. As described above, prior to this invention, a prefetch instruction provides a prefetch of an invariable, static size and provides no other capabilities such as cache management. That is, the prior art instruction only triggers a prefetch. According to this invention, on the otherhand, the compiled instruction 28 includes the following binary fields: <OPCODE> <I/D BIT> <SET #> <ADDR> <SIZE>.

The <OPCODE> is the field which identifies the prefetch command as a prefetch command. The <I/D BIT> field indicates whether the prefetch is for data or instructions.

The <SET #> field is identified to indicate into which set the information is to be preloaded. The <ADDR> field indicates the address where prefetching begins. The <SIZE>field provides a variable prefetch size. Of course, the above prefetch instruction or any portion thereof can be generated by the loader or runtime software as well and any one of the fields can be stored in any accessible location.

The <SIZE> field provides a binary number which indicates how many lines to fetch. The mechanism described here is static although optimizing software tools to execute a program to monitor cache misses and vary the size field accordingly are within the scope of this invention. The <SIZE> field as generally discussed here is tunable by the compiler in that a programmer can redefine it according to the compiler task. To adjust for optimal size in a static implementation, a programmer runs the software in a simulation environment and then makes adjustments to the size field depending upon the performance of the system, that is, if the miss penalty is too high.

Figure 4:
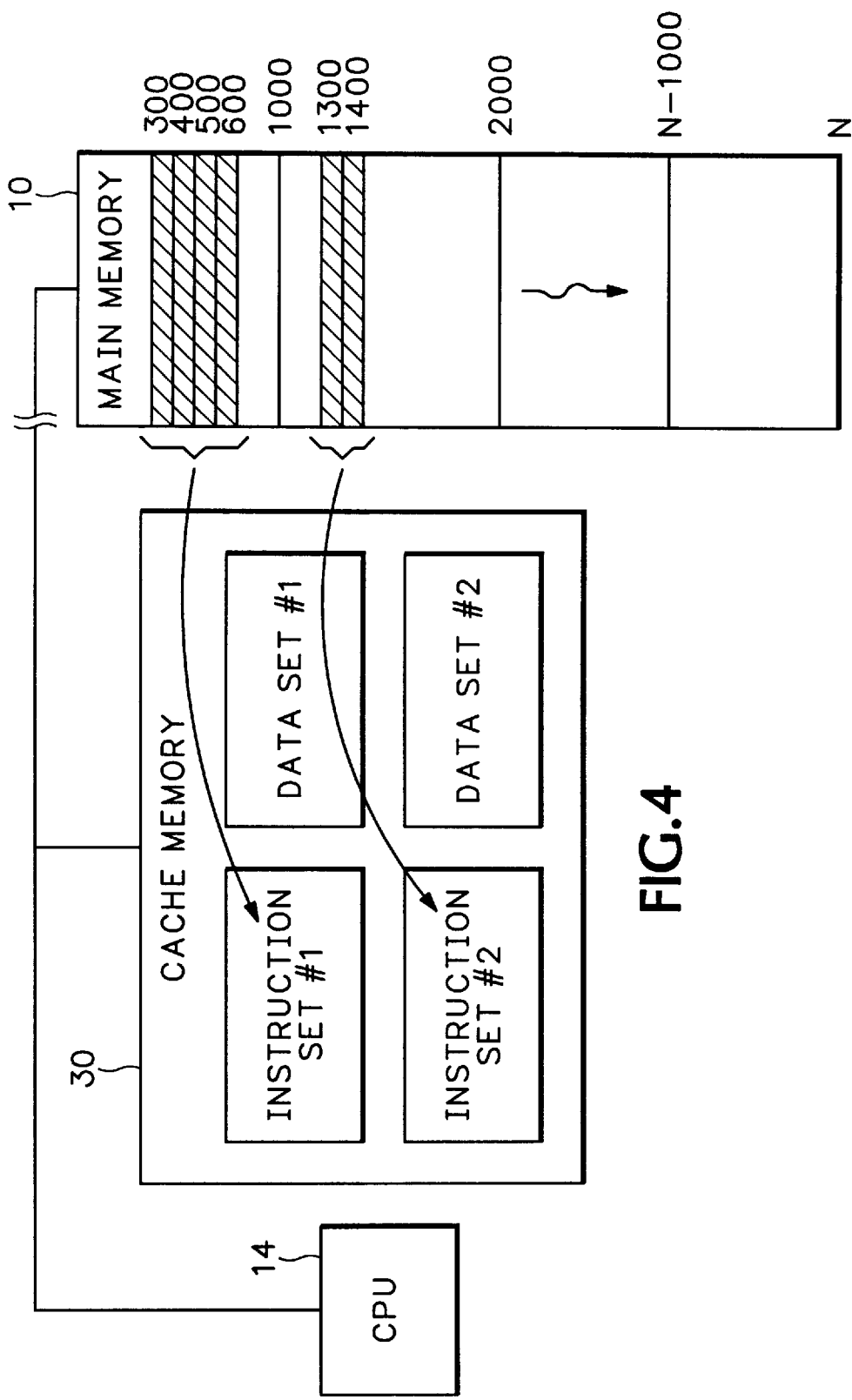
FIG. 4 depicts a Harvard architecture system where a prefetch instruction of this invention is carried out.

Turning to FIG. 4, CPU 14 and main memory 10 are shown with cache memory 30 which is a multi-set (here, two-set) cache of Harvard architecture. Instruction Cache Sets #1 and #2 are shown as are Data Cache Sets #1 and #2. A prefetch instruction generated by the compiler for example includes the following values: <Prefetch> <I> <1> <300> <4>.

In such a case, the prefetch is executed to retrieve and store in the Instruction Cache Set #1, instructions starting at line 300 and of a size of four (4) lines, that is, lines 300, 400, 500 and 600. In a different prefetch, the memory block starting at line 1300 consists of two lines which are necessary to carry out a different particular operation and therefore are stored in a different set than the block starting at line 300, i.e. Instruction Cache Set #2, to avoid a cache miss in Instruction Cache Set #1. The processes for optimization of the size fields and the cache set location are discussed below.

Reduction of thrashing is enhanced by providing the prefetch hardware (the CPU) with information as to the optimal cache set location and the optimal amount of data to be prefetched. Depending upon the architecture of the computer, compilers will use different schemes to optimize performance of the CPU. In one implementation, for example, the compiler may assign the least recently used set, for example, taking into account the program flow.

In the alternative, empty fields may be provided by the compiler in the compiled prefetch instruction so that an operating system, loader or runtime software may ultimately provide binary values to the fields during execution according to particular policies, and such is within the scope of this invention. A similar configuration is described in simultaneously filed U.S. patent application entitled, Memory Management Unit Incorporating Prefetch Control, Ser. No. 08/499,364, filed on Jul. 7, 1995 which is herein incorporated by reference.

Figure 5:
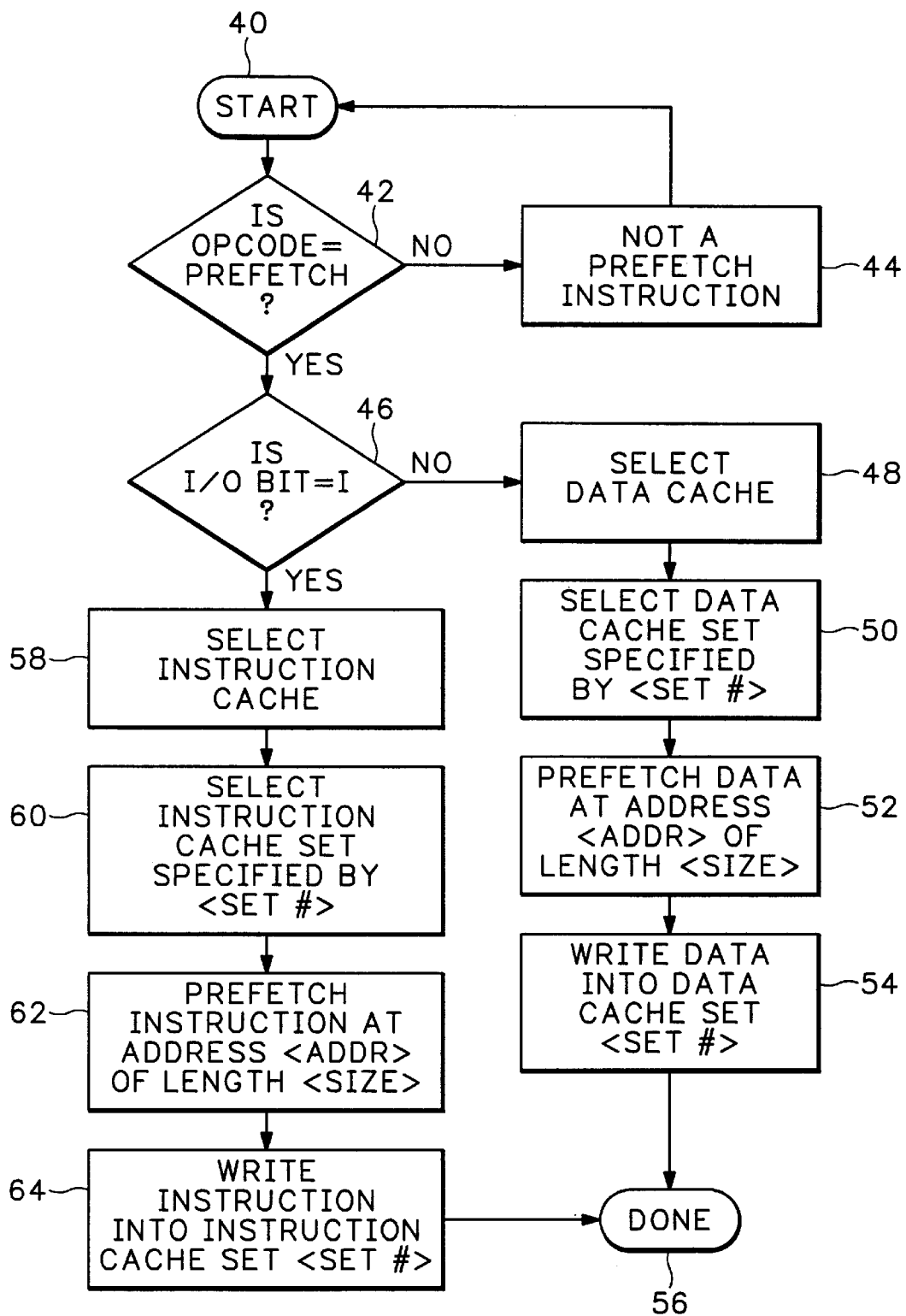
FIG. 5 is a flowchart depicting the steps for carrying out a prefetch instruction of this invention.

Turning to FIG. 5, a flowchart is shown which illustrates an order in which to carry out the prefetch instruction. After the program is started at element 40, the system recognizes the <OPCODE> field 42 as indicating whether or not the instruction is a prefetch instruction. Where there is no prefetch instruction 44 the program resumes at a different instruction.

When the system has determined that the instruction is in fact a prefetch instruction, the first inquiry is whether the <I/D> field 46 indicates an "I" for instruction or a "D" for data. In a system with Harvard architecture, the <I/D> field will indicate which cache to store the retrieved information, that is, in the instruction cache or the data cache.

If the <I/D> field indicates that the prefetch will be fetching data, the system and method selects the data cache 48. After that, the data cache set is selected which is specified by <SET #> 50. The system then prefetches the data at the address specified by the <ADDR> field of length specified by <SIZE> at element 52. Finally, the data is written to the data cache set specified by <SET #> 54 and is done 56.

Alternatively, were the I/D decision box 46 to indicate that an instruction is to be prefetched, the instruction cache would be selected at element 58. After that, the instruction cache set is selected which is specified by <SET #> 60. The system then prefetches the instruction at the address specified by the <ADDR> field of length specified by <SIZE> at element 62. Finally, the instruction is written to the instruction cache set specified by <SET #> 64 and is done 56.

While the above description of FIG. 5 presupposes that the platform on which this program runs includes the capability of carrying out prefetches and is a multi-set Harvard architecture, this method and system is, of course, cross platform. For example, if the system is incapable of executing a prefetch command, it will no-op the <OPCODE> field. Also, if the system does not have multiple sets, it will simply ignore the <SET #> field. The same is true for the <I/D> field. Moreover, with respect to the size field, the compiler may give that field a certain value which is overridden by the system. The invention described herein resides in the fields themselves and a system and method by which to generate and utilize them.

I claim:

1. A method for use by a computer, said method for prefetching information which is either data or instructions from a main memory to a cache memory including a data cache set and an instruction cache set, comprising the steps of:

executing a prefetch command including prefetch instructions which includes an address field indicating the address of said information in said main memory and a variable instruction/data field for specifying what type of information is to be retrieved from said main memory;

deciding whether said information is data or instructions and filling said instruction/data field with a data/instruction value;

accessing said information in said main memory;

if in said deciding step it is decided that said information is data, after retrieving said data, sending said data to said data cache set as specified by said data/instruction field; and if in said deciding step it is decided that said information is instruction, after retrieving said instruction, sending said data to said instruction cache set as specified by said data/instruction field.

2. A method as recited in claim 1 wherein said cache memory includes at least two data cache sets or at least two instruction cache sets and wherein said prefetch instruction further includes a variable set field for either specifying to which of said at least two data cache sets said information is to be written or specifying to which of said at least two instruction cache sets said information is to be written, said method further comprising the step of:

storing said information in either one of said at least two data cache sets or one of said at least two instructions sets as specified by said set field.

3. A method as recited in claim 1 wherein said prefetch instruction includes a variable size field for specifying the length of said data to be retrieved from said main memory, said method further comprising the steps of;

in said accessing step, retrieving an amount of said data from said main memory equal to the length specified in said size field; and storing said retrieved data in said data cache set.

4. A method as recited in claim 1 wherein said prefetch instruction includes a variable size field for specifying the length of said instruction to be retrieved from said main memory, said method further comprising the steps of;

in said accessing step, retrieving an amount of said instruction from said main memory equal to the length specified in said size field; and storing said retrieved instruction in said instruction cache set.

5. A method for use by a computer, said method for prefetching information which is either data or instructions from a main memory to a cache memory, comprising the steps of:

executing a prefetch command including a prefetch instruction which includes a variable address field indicating the address of said information in said main memory and a size field for specifying the amount of said information to be retrieved from said main memory;

accessing said information in said main memory in accordance with said address field;

retrieving an amount of said information residing at said address equal to the length specified in said size field; and sending said retrieved information to said cache memory;

wherein said cache memory includes a data cache set and an instruction cache set, wherein said prefetch instruction further includes a variable instruction/data field for specifying what type of information is to be retrieved from said main computer memory, said method further comprising the step of:

deciding whether said information is data or instruction and filling said instruction/data field with a data/instruction value;

if in said deciding step it is decided that said information is data, after retrieving said data, storing said data to said data cache set as specified by said data/instruction field; and if in said deciding step it is decided that said information is instructions, after retrieving said instruction, storing said instructions to said instruction cache set as specified by said data/instruction field.

6. A method as recited in claim 5 wherein said cache memory includes at least two cache sets and wherein said prefetch instruction includes a variable set field for specifying to which of said at least two cache sets said information is to be written, said method further comprising the step of:

storing said information in either one of said at least two cache sets as specified by said set field.

7. A method for use by a computer, said method for prefetching information to a cache memory including at least two cache sets, comprising the steps of:

executing a prefetch command including a prefetch instruction which includes a variable set field for specifying to which of said at least two cache sets said information is to be written;

accessing said information in said main memory;

retrieving said information from said main memory; and sending said information to one of said two cache sets as specified by said set field;

wherein said information is either instructions or data and wherein said cache memory includes a data cache set and an instruction cache set, wherein said prefetch instruction further includes a variable instruction/data field for specifying what type of information is to be retrieved from said main computer memory, said method further comprising the steps of:

deciding whether said information is data or instructions and filling said instruction/data field with a data/instruction value;

if in said deciding step it is decided that said information is data, after retrieving said data, storing said data in said data cache set as specified by said data/instruction field; and if in said deciding step it is decided that said information is instructions, after retrieving said instructions, storing said instruction cache set as specified by said data/instruction field.

8. A method as recited in claim 7 wherein said prefetch instruction includes a variable size field for specifying the amount of said information to be retrieved from said main memory, said method further comprising the steps of:

in said retrieving step, retrieving an amount of said information equal to the amount specified in said size field; and storing said retrieved data in said one of said two caches sets as specified by said size field.

9. A prefetch command system, said system including a CPU capable of running a program, a main memory maintaining stored information including instructions and data and a cache memory including an instruction cache set and a data cache set, comprising:

a prefetch instruction provided to said CPU by a program running thereon, comprising:

an address field to indicate to said CPU where in said main memory to locate said stored information;

a variable instruction/data field to indicate to said CPU whether said stored information is instruction or data and thus to indicate whether to store said information in said instruction cache set or said data cache set as specified by said instruction/data field.

10. A system as recited in claim 9 further comprising:

a variable size field to indicate to said CPU how much information to retrieve from said main memory and store in said cache memory as specified by said size field.

11. A system as recited in claim 10 wherein said instruction cache set includes at least two cache sets and wherein said data cache set includes at least two cache sets, further comprising:

a variable cache set field to indicate which of said cache sets to store information retrieved from said main memory as specified by said set field.

12. A prefetch command system, said system including a CPU capable of running a program, a main memory maintaining stored information including instructions and data and a cache memory, comprising:

a prefetch instruction provided to said CPU by a program running thereon, comprising:

an address field to indicate to said CPU where in said main memory to locate said stored information; and a variable size field to indicate to said CPU how much information to retrieve from said main memory and store in said cache memory as specified by said size field; and wherein said cache memory includes an instruction cache set and a data cache set, said system further comprising:

a variable instruction/data field to indicate to said CPU whether said information is instructions or data and thus to indicate whether to store said information in said instruction cache set or said data cache set as specified by said instruction/data field.

13. A system as recited in claim 12 wherein said instruction cache set includes at least two cache sets and wherein said data cache set includes at least two cache sets, said system further comprising:

a variable cache set field to indicate which of said cache sets to store said information retrieved from said main memory as specified by said set field.

14. A prefetch command system, said system including a CPU capable of running a program, a main memory maintaining stored information including instructions and data and a cache memory including at least two cache sets, comprising;

a prefetch instruction provided to said CPU by a program running thereon, comprising:

an address field to indicate to said CPU wherein said main memory to locate said stored information; and a variable cache set field to indicate which of said at least two cache sets to store information retrieved from said main memory as specified by said set field; and wherein said cache memory further includes an instruction cache set and a data cache set, said system further comprising:

a variable instruction/data field to indicate to said CPU whether said information is instructions or data and thus to indicate whether to store said information in said instruction cache set or said data cache set as specified by said instruction/data field.

15. A prefetch command component operable in conjunction with a CPU capable of running a program wherein a prefetch instruction is provided to said CPU by said program, a main memory maintaining stored information including instructions and data and a cache memory including at least two cache sets, said component comprising:

an address field to indicate to said CPU where in said main memory to locate said stored information; and a variable cache set field to indicate which of said at least two cache sets to store information retrieved from said main memory as specified by said set field; and wherein said cache memory further includes an instruction cache set and a data cache set, said component further comprising:

a variable instruction/data field to indicate to said CPU whether said information is instructions or data and thus to indicate whether to store said information in said instruction cache set or said data cache set as specified by said instruction/data field.

16. A component as recited in claim 15 further comprising:

a variable size field to indicate to said CPU how much information to retrieve from said main memory and store in said cache memory as specified by said size field.

* * * * *